(12) United States Patent
Kokubu et al.

(10) Patent No.: US 10,553,878 B2
(45) Date of Patent: Feb. 4, 2020

(54) POSITIVE ELECTRODE ACTIVE MATERIAL FOR NON-AQUEOUS ELECTROLYTE SECONDARY BATTERIES

(71) Applicant: PANASONIC INTELLECTUAL PROPERTY MANAGEMENT CO., LTD., Osaka-shi, Osaka (JP)

(72) Inventors: Takao Kokubu, Osaka (JP); Atsushi Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 206 days.

(21) Appl. No.: 15/861,846

(22) Filed: Jan. 4, 2018

(65) Prior Publication Data

US 2018/0131006 A1 May 10, 2018

Related U.S. Application Data

(63) Continuation of application No. PCT/JP2016/003663, filed on Aug. 9, 2016.

(30) Foreign Application Priority Data

Sep. 30, 2015 (JP) .................................. 2015-193534

(51) Int. Cl.
*H01M 4/90* (2006.01)
(52) U.S. Cl.
CPC .................................. *H01M 4/9033* (2013.01)
(58) Field of Classification Search
None
See application file for complete search history.

(56) References Cited

U.S. PATENT DOCUMENTS

2005/0106463 A1  5/2005  Kikuchi et al.
2009/0081547 A1  3/2009  Nakura
(Continued)

FOREIGN PATENT DOCUMENTS

JP   2004-6277 A    1/2004
JP   2004-335278 A  11/2004
(Continued)

OTHER PUBLICATIONS

International Search Report dated Nov. 15, 2016, issued in Counterpart of International Application No. PCT/JP2016/003663 (2 pages).

*Primary Examiner* — Wojciech Haske
(74) *Attorney, Agent, or Firm* — Westerman, Hattori, Daniels & Arian, LLP

(57) ABSTRACT

The present disclosure is directed to a positive electrode active material for non-aqueous electrolyte secondary batteries that is capable of suppressing an increase in battery direct current resistance due to high-temperature storage (e.g., storage at 60° C. or higher). Positive electrode active material particles in one aspect of the present disclosure include secondary particles formed by aggregation of primary particles of a lithium transition metal oxide containing Ni and Mn and include a boron compound present in the inner part and surface of the secondary particles. The difference in composition ratio between Ni and Mn in the lithium transition metal oxide is more than 0.2. The proportion of the boron element content in the inner part of the secondary particles to the total boron element content in the inner part and surface of the secondary particles is in the range from 5% by mass to 60% by mass.

5 Claims, 1 Drawing Sheet

(56) References Cited

U.S. PATENT DOCUMENTS

| | | | |
|---|---|---|---|
| 2010/0209771 A1* | 8/2010 | Shizuka | B82Y 30/00 429/207 |
| 2012/0301786 A1 | 11/2012 | Takamuku et al. | |
| 2016/0013476 A1 | 1/2016 | Oh et al. | |

FOREIGN PATENT DOCUMENTS

| | | |
|---|---|---|
| JP | 2005-158612 A | 6/2005 |
| JP | 2007-18985 A | 1/2007 |
| JP | 2012-142154 A | 7/2012 |
| WO | 2014/050115 A1 | 4/2014 |
| WO | 2015/065046 A1 | 5/2015 |

* cited by examiner

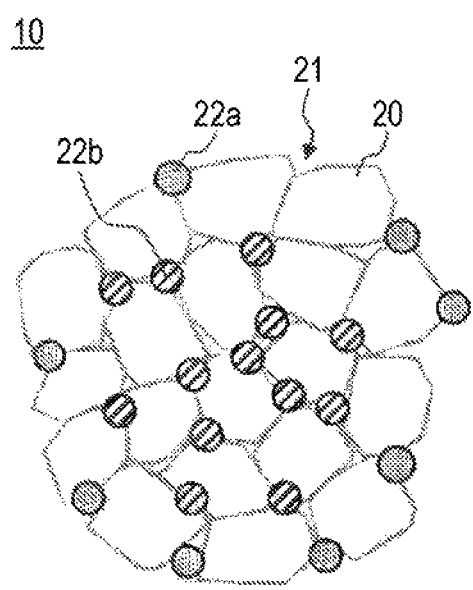

POSITIVE ELECTRODE ACTIVE MATERIAL FOR NON-AQUEOUS ELECTROLYTE SECONDARY BATTERIES

TECHNICAL FIELD

The present invention relates to techniques per to positive electrode active materials for non-aqueous electrolyte secondary batteries.

BACKGROUND ART

Examples of techniques for improving charge/discharge cycle characteristics and other characteristics by suppressing the side reaction between a positive electrode active material and an electrolyte solution in order to achieve high voltage include a technique of solid-dissolving a foreign element in a lithium transition metal oxide that forms a positive electrode active material (see, for example, Patent Literature 1) and a technique of mixing a rare earth compound and lithium borate (see, for example, Patent Literature 2).

CITATION LIST

Patent Literature

PTL 1: Japanese Published Unexamined Patent Application No. 2012-142154
PTL 2: International Publication No. WO 2014/050115

SUMMARY OF INVENTION

However, the techniques disclosed in Patent Literature 1 and Patent Literature 2 have a problem in that high-temperature storage (e.g., storage at 60° C. or higher) of non-aqueous electrolyte secondary batteries including lithium transition metal oxides having a high Ni content increases the direct current resistance (hereinafter may be referred to as DCR) of the batteries.

The present disclosure is directed to a positive electrode active material for non-aqueous electrolyte secondary batteries that is capable of suppressing an increase in battery direct current resistance due to high-temperature storage (e.g., storage at 50° C. or higher).

A positive electrode active material for non-aqueous electrolyte secondary batteries in one aspect of the present disclosure includes secondary particles formed by aggregation of primary particles of a lithium transition metal oxide containing Ni and Mn; and a boron compound present in the inner part and surface of the secondary particles. The difference in composition ratio between Ni and Mn in the lithium transition metal oxide is more than 0.2. The proportion of the boron element content in the inner part of the secondary particles to the total boron element content in the inner part and surface of the secondary particles is in the range from 5% by mass to 60% by mass.

According to one aspect of the present disclosure, an increase in battery direct current resistance due to high-temperature storage can be suppressed.

BRIEF DESCRIPTION OF DRAWING

FIG. 1 is a schematic sectional view of positive electrode active material particles in one aspect of the present disclosure.

DESCRIPTION OF EMBODIMENT (Knowledge Underlying the Present Disclosure)
In the related art, a positive electrode active material containing a lithium transition metal oxide containing Ni and Mn has a problem in that high-temperature storage (e.g., at 60° C. or higher) of batteries, particularly high-temperature storage of batteries in a charged state causes the positive electrode active material to undergo elution of Ni and the side reaction with an electrolyte solution on the surface of the positive electrode active material, increasing the direct current resistance of batteries. The inventors of the present disclosure have carried out diligent studies and have found that an increase in the direct current resistance of batteries due to high-temperature storage can be suppressed by increasing the difference in composition ratio between Ni and Mn (increasing the Ni content) and controlling the amount of a boron compound in the inner part and surface of secondary particles of a lithium transition metal oxide containing Ni and Mn in a positive electrode active material containing the lithium transition metal oxide and the boron compound.

A positive electrode active material for non-aqueous electrolyte secondary batteries in one aspect of the present disclosure includes secondary particles formed by aggregation of primary particles of a lithium transition metal oxide containing Ni and Mn; and a boron compound present in the inner part and surface of the secondary particles. The difference in composition ratio between Ni and Mn in the lithium transition metal oxide is more than 0.2. The proportion of the boron element content in the inner part of the secondary particles to the total boron element content in the inner part and surface of the secondary particles is in the range from 5% by mass to 60% by mass. According to the positive electrode active material for non-aqueous electrolyte secondary batteries in one aspect of the present disclosure, an increase in the direct current resistance of a battery due to high-temperature storage can be suppressed, for example, when the battery is stored at a temperature as high as 60° C. or higher, particularly when the battery is stored in a charged state at a high temperature.

The mechanism of this phenomenon is not well understood but may be associated to the following fact. When the difference in composition ratio between Ni and Mn is more than 0.2 and a boron compound in the above range is present in the inner part and surface of the secondary particles, the crystal structure is stable so that Ni is unlikely to elute, and a dense film is formed in close contact with the surface of the secondary particles to suppress the side reaction in the surface of the secondary particles. This suppresses, for example, a decrease in the electrical conductivity of the positive electrode active material to suppress an increase in battery direct current resistance due to high-temperature storage. The reason why the crystal structure is stable so that Ni is unlikely to elute may be that the boron element is present at the boundaries between the primary particles at which metal elution tends to occur. The reason why a dense film is formed in close contact with the surface of the secondary particles may be that the presence of boron in the inner part of the secondary particles increases the affinity of the secondary particles to the boron compound attached to the surface of the secondary particles.

For a positive electrode active material for non-aqueous electrolyte secondary batteries in another aspect of the present disclosure, for example, the boron compound present in the surface of the secondary particles is one compound selected from lithium borate, lithium metaborate, and lithium tetraborate.

For a positive electrode active material for non-aqueous electrolyte secondary batteries in another aspect of the present disclosure, for example, the lithium transition metal oxide containing Ni and Mn further contains boron, and at least part of the boron compound present in the inner part of the secondary particles is a lithium transition metal oxide containing boron. In other words, at least part of the boron compound in the inner part of the secondary particles forms a solid solution with the lithium transition metal oxide. Because of this, the boron compound is uniformly dispersed in the inner part of the secondary particles, which effectively suppresses the elution of Ni and further suppresses an increase in battery direct current resistance due to high temperature storage.

For a positive electrode active material for non-aqueous electrolyte secondary batteries in another aspect of the present disclosure, for example, the difference in composition ratio between Ni and Mn in the lithium transition metal oxide is 0.25 or more. Such a difference leads to a large battery capacity while an increase in battery direct current resistance due to high-temperature storage is suppressed.

For a positive electrode active material for non-aqueous electrolyte secondary batteries in another aspect of the present disclosure, for example, the proportion of the boron element content in the inner part of the secondary particles to the total boron element content in the inner part and surface of the secondary particles is in the range from 9% by mass to 53% by mass. Such a proportion results in further suppression of an increase in battery direct current resistance due to high-temperature storage.

An example non-aqueous electrolyte secondary battery including the positive electrode active material in one aspect of the present disclosure will be described below. The drawing to which reference is made in the description of an embodiment is schematically illustrated. The dimensional ratios and the like of components in the drawing may be different from actual dimensional ratios and the like. Specific dimensional ratios and the like should be determined in consideration of the following description.

A non-aqueous electrolyte secondary battery according to an exemplified embodiment includes a negative electrode, a positive electrode, and a non-aqueous electrolyte containing a non-aqueous solvent. A separator is preferably interposed between the positive electrode and the negative electrode. Examples of the structure of the non-aqueous electrolyte secondary battery include a structure in which the non-aqueous electrolyte and an electrode body formed by winding the positive electrode and the negative electrode with the separator interposed therebetween are placed in a housing. Alternatively, other types of electrode bodies, such as a stacked-type electrode body formed by stacking the positive electrode and the negative electrode with the separator interposed therebetween, may be employed instead of the wound-type electrode body. The non-aqueous electrolyte secondary battery may be of any type, such as a cylindrical type, a prismatic type, a coin type, a button type, and a laminate type.

<Positive Electrode>

The positive electrode includes, for example, a positive electrode current collector formed of a metal foil or the like, and a positive electrode mixture layer formed on the positive electrode current collector. The positive electrode current collector is, for example, a foil made of a metal, such as aluminum, stable in the potential range of the positive electrode or a film having a surface layer made of the metal. The positive electrode mixture layer contains a positive electrode active material for non-aqueous electrolyte secondary batteries and preferably further contains a conductive material and a binding material.

FIG. 1 is a schematic sectional view of positive electrode active material particles in one aspect of the present disclosure. As illustrated in FIG. 1, positive electrode active material particles 10 include a secondary particle 21 of a lithium transition metal oxide containing Ni and Mn formed by aggregation of primary particles 20 of the lithium transition metal oxide; a boron compound 22a present in the surface of the secondary particle 21; and a boron compound 22b present in the inner part of the secondary particle 21.

The boron compound 22a present in the surface of the secondary particle 21 illustrated in FIG. 1 is dispersed in the form of primary particles or secondary particles and located in the surface of the secondary particle 21. The boron compound 22b present in the inner part of the secondary particle 21 illustrated in FIG. 1 is dispersed in the form of primary particles or secondary particles and located in the inner part of the secondary particle 21. In FIG. 1, the boron compounds (22a, 22b) present in the surface and inner part of the secondary particle 21 exist in a non-solid solution state, specifically, do not form a solid solution with the lithium transition metal oxide.

Here, the boron compound present in the inner part of the secondary particle may be solid dissolved in the lithium transition metal oxide, that is, may exist in the form of a lithium transition metal oxide containing a boron element (B). As described above, at least part of the boron compound present in the inner part of the secondary particle forms a solid solution with the lithium transition metal oxide (a lithium transition metal oxide containing boron). The formation of the solid solution allows the boron compound to be uniformly dispersed in the inner part of the secondary particle comparing with, for example, the case (the boron compound 22b illustrated in FIG. 1) where all the boron compound present in the inner part of the secondary particle exists in a non-solid solution state. As a result, the elution of Ni is suppressed and an increase in battery direct current resistance during high-temperature storage is further suppressed.

The lithium transition metal oxide containing Ni and Mn and the boron compound present in the surface and inner part of the secondary particles will be described below in more detail.

For the lithium transition metal oxide containing Ni and Mn, the difference in composition ratio between Ni and Mn in the lithium transition metal oxide is more than 0.2. The expression "the difference in composition ratio between Ni and Mn in the lithium transition metal oxide is more than 0.2" means that the difference between the proportion of Ni and the proportion of Mn to the total moles of metal elements except for Li in the lithium transition metal oxide is more than 20%. The general formula of the lithium transition metal oxide is represented by, for example, $Li_{1+x}Ni_aMn_bY_cO_{2+d}$ (Y is at least one element except for Li, Ni, and Mn, a+b+c=1.0, $-0.05 < x \leq 0.2$, $0.2 < a-b$, and $-0.1 \leq d \leq 0.1$).

In the general formula, Y is not limited as long as is at least one element except for Li, Ni, and Mn. Y is, for example, at least one element selected from, for example, Co, Fe, Al, Mg, Ti, Cr, Cu, Ze, Sn, Zr, Nb, Mo, Ta, W, Na, K, Ba, Sr, Bi, Be, and B. Y preferably includes at least one element selected from Co, Al, Mg, Zr, W, and other elements from the viewpoint of, for example, structural stability.

When the boron compound present in the inner part of the secondary particles forms a solid solution with the lithium transition metal oxide, Y in the general formula includes at least B but preferably includes, in addition to B, at least one element selected from Co, Al, Mg, Zr, W, and other elements from the viewpoint of, for example, structural stability.

In the general formula, a–b is more than 0.2 but preferably 0.25 or more and more preferably in the range from 0.25 to 0.30 in order to achieve large battery capacity while suppressing an increase in battery direct current resistance due to high-temperature storage. In other words, the difference between the proportion of Ni and the proportion of Mn to the total moles of metal elements except for Li in the lithium transition metal oxide is 20% or more but preferably 25% or more and more preferably in the range from 25% to 30%. If the difference in composition ratio between Ni and Mn in the lithium transition metal oxide (a–b in the general formula) is 0.2 or less, it is difficult to suppress an increase in battery direct current resistance due to high-temperature storage.

The average particle size of the primary particles of the lithium transition metal oxide is preferably 100 nm or more and 5 µm or less and more preferably 300 nm or more and 2 µm or less. If the average particle size is less than 100 nm, the number of the interfaces between the primary particles including those in the inner part of the secondary particles is so large that expansion and shrinkage of the positive electrode active material in charge/discharge cycles may tend to cause cracking of the primary particles. If the average particle size is more than 5 µm, the number of the interfaces between the primary particles including those in the inner part of the secondary particles is so small that the output particularly at low temperatures may decrease. The average particle size of the secondary particles of the lithium transition metal oxide is preferably 2 µm or more and 40 µm or less and more preferably 4 µm or more and 20 µm or less. If the average particle size is less than 2 µm, the secondary particles are so small that the packing density may be low as the positive electrode active material and the capacity may not be large enough. If the average particle size is more than 40 µm, the output particularly at low temperatures may not be sufficient. Since the secondary particles of the lithium transition metal oxide are formed by aggregation of the primary particles of the lithium transition metal oxide, the primary particles of the lithium transition metal oxide are not larger than the secondary particles of the lithium transition metal oxide.

The average particle size is obtained by, for example, measuring the particle size of each of several tens of particles while observing the surface and cross section of the particles through a scanning electron microscope (SEM).

In the positive electrode active material particles in one aspect of the present disclosure, the amount of the boron compound present in the inner part of the secondary particles is in the range from 5% by mass to 60% by mass in terms of the proportion of the boron element content in the inner part of the secondary particles to the total boron element content in the surface and inner part of the secondary particles. The amount of the boron compound present in the inner part of the secondary particles is preferably in the range from 9% by mass to 53% by mass in order to, for example, further suppress an increase in battery direct current resistance due to high-temperature storage. The proportion of the boron element content in the inner part of the secondary particles to the total boron element content in the surface and inner part of the secondary particles (hereinafter may be referred to as an inner boron proportion) is obtained in accordance with the following formula.

$$A\ (\%\ \text{by mass}) = (1 - (B/C)) \times 100$$

A: Inner Boron Proportion
B: Boron Element Content in Surface of Secondary Particles
C: Boron Element Content in Surface and Inner Part of Secondary Particles The boron element content in the surface of the secondary particles is a value obtained by washing the secondary particles with water for 20 minutes and measuring the amount of boron eluted with water through inductively coupled plasma (ICP) optical emission spectroscopy. The boron element content in the surface and inner part of the secondary particles is a value obtained by dissolving the secondary particles in hydrochloric acid and measuring the amount of boron in the obtained solution through ICP optical emission spectroscopy.

When the inner boron proportion is in the range from 5% by mass to 60% by mass, the elution of Ni and the side reaction in the surface of the secondary particles are suppressed, and an increase in battery direct current resistance due to high-temperature storage is suppressed. This is because of a specific effect obtained in the case where the difference in composition ratio between Ni and Mn is more than 0.2. If the inner boron proportion is less than 5% by mass, the amount of the boron compound present in the inner part of the secondary particles is small, so that the elution of Ni is not sufficiently suppressed even when the difference in composition ratio between Ni and Mn is more than 0.2. If the inner boron proportion is more than 60% by mass, the amount of the boron compound present in the surface of the secondary particles is small, so that the side reaction in the surface of the secondary particles is not suppressed even when the difference in composition ratio between Ni and Mn is more than 0.2. In either case, an increase in battery direct current resistance due to high-temperature storage cannot be suppressed.

Examples of the boron compound present in the surface of the secondary particles include boron oxide, boric acid, lithium borate, metaboric acid, lithium metaborate, and lithium tetraborate. Among these boron compounds, for example, lithium borate, lithium metaborate, and lithium tetraborate are preferred in order to, for example, effectively suppress an increase in direct current resistance during high-temperature storage and to facilitate handling. Examples of the boron compound that exists in a non-solid solution state together with the lithium transition metal oxide in the inner part of the secondary particles include boron oxide, boric acid, lithium borate, metaboric acid, lithium metaborate, and lithium tetraborate, which are the same as the boron compound present in the surface of the secondary particles.

The average particle size of the boron compound present in the surface of the secondary particles is preferably 1 nm or more and 500 nm or less and more preferably 2 nm or more and 100 nm or less. If the average particle size is less than 1 nm, the boron compound may not sufficiently cover the surface of the secondary particles. If the average particle size is more than 500 nm, the boron compound thickly covers the surface of the secondary particles and thus may inhibit the electrochemical reaction. The average particle size of the boron compound that exists in a non-solid solution state together with the lithium transition metal oxide in the inner part of the secondary particles is preferably 1 nm or more and 500 nm or less and more preferably 2 nm or more and 100 nm or less.

An example method for producing the positive electrode active material according to the present disclosure will be described.

A solid solution A is produced as follows: mixing a lithium compound, a transition metal oxide containing Ni and Mn, and a boron compound, which are raw materials, at predetermined mounts of the Ni and Mn atoms and the boron atom in terms of the molar ratio to the Li atom; and firing the mixture at a predetermined temperature. As desired, the solid solution A is pulverized into a predetermined particle size. While the solid solution A is mixed, an aqueous solution containing the boron compound is then added (sprayed) and dried at a predetermined temperature. This process can provide positive electrode active material particles that have secondary particles formed by aggregation of primary particles of the lithium transition metal oxide containing Ni and Mn and that have the boron compound present in the surface and inner part of the secondary particles. The inner boron proportion can be adjusted by, for example, the amount of the boron compound to be added during production of the solid solution A, and the amount of the boron compound to be attached to the surface.

Examples of the lithium compound serving as a raw material include lithium hydroxide, lithium nitrate, lithium carbonate, and lithium chloride. Examples of the transition metal compound serving as a raw material include hydroxides, nitrates, carbonates, and chloride salts of transition metals, such as Ni and Mn. Examples of the boron compound serving as a raw material include boron oxide, boric acid, lithium borate, metaboric acid, lithium metaborate, and lithium tetraborate.

As the lithium transition metal oxide, the above-described lithium transition metal oxide containing Ni and Mn is not necessarily used alone and may be used together with a different positive electrode active material. Examples of the different positive electrode active material include lithium cobalt oxide, which can intercalate and deintercalate lithium ions while maintaining the crystal structure stable.

The conductive material is used to, for example, increase the electrical conductivity of the positive electrode mixture layer. Examples of the conductive material include carbon materials, such as carbon black, acetylene black, Ketjenblack, and graphite. These conductive materials may be used alone or in combination of two or more.

The binding material is used to, for example, maintain a favorable contact between the positive electrode active material and the conductive material and to improve the adhesion of, for example, the positive electrode active material to the surface of the positive electrode current collector. Examples of the binding material include fluorine-containing resins, such as polytetrafluoroethylene (PTFE) and polyvinylidene fluoride (PVdF), polyacrylonitrile (PAN), polyimide-based resins, acrylic resins, and polyolefin-based resins. These resins may be used in combination with carboxymethyl cellulose (CMC) or a salt thereof (may be, for example, CMC-Na, CMC-K, or CMC-$NH_4$, or a partially neutralized salt), polyethylene oxide (PEO), or the like. These binding materials may be used alone or in combination of two or more.

<Negative Electrode>

The negative electrode preferably includes a negative electrode current collector formed of, for example, a metal foil, and a negative electrode mixture layer formed on the current collector. The negative electrode current collector may be formed of, for example, a foil made of a metal, such as copper, stable in the potential range of the negative electrode or a film having a surface layer made of the metal. The negative electrode mixture layer preferably includes a binding material and other materials in addition to the negative electrode active material.

Examples of the negative electrode active material include carbon materials that can intercalate and deintercalate lithium, metals that can be alloyed with lithium, and alloy compounds containing such metals. Examples of carbon materials include coke and graphite, such as natural graphite, non-graphitizable carbon, and synthetic graphite. Examples of alloy compounds include compounds containing at least one metal that can be alloyed with lithium. In particular, elements that can be alloyed with lithium are preferably silicon and tin or may be oxides of these elements, such as silicon oxide and tin oxide. Furthermore, a mixture of the above-described carbon material and a silicon or tin compound can also be used. In addition to the above-described materials, materials such as lithium titanium oxide that provide a higher charging and discharging potential for metal lithium than carbon materials can also be used as a negative electrode material although the energy density decreases.

Examples of the binding material include fluorine-containing resins, PAN, polyimide-based resins, acrylic resins, and polyolefin-based resins, which are the same as those for the positive electrode. When the mixture slurry is prepared using an aqueous solvent, CMC or a salt thereof (may be, for example, CMC-Na, CMC-K, or CMC-$NH_4$, or a partially neutralized salt), styrene-butadiene rubber (SBR), polyacrylic acid (PAA) or a salt thereof (may be, for example, PAA-Na, PAA-K, or a partially neutralized salt), polyvinyl alcohol (PVA), or the like is preferably used.

<Non-Aqueous Electrolyte>

The non-aqueous electrolyte contains a non-aqueous solvent and an electrolyte salt dissolved in the non-aqueous solvent. The non-aqueous electrolyte is not limited to a liquid electrolyte (non-aqueous electrolyte solution) and may be a solid electrolyte formed by using a gel polymer or the like. Examples of the non-aqueous solvent include esters, ethers, nitriles such as acetonitrile, amides such as dimethylformamide, and a solvent mixture of two or more of these solvents. The non-aqueous solvent may contain a halogenated product formed by substituting at least part of hydrogen atoms of such a solvent with halogen atoms, such as a fluorine atom.

Examples of the esters include cyclic carbonates, such as ethylene carbonate (EC), propylene carbonate (PC), and butylene carbonate; chain carbonates, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylates, such as γ-butyrolactone (GBL) and γ-valerolactone (GVL); and chain carboxylates, such as methyl acetate, ethyl acetate, propyl acetate, methyl propionate (MP), ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butyleneoxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

The halogenated product is preferably, for example, a fluorinated cyclic carbonate such as fluoroethylene carbonate (FEC), a fluorinated chain carbonate, or a fluorinated chain carboxylate such as fluoromethyl propionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lower-aliphatic lithium carboxylates, borates, such as $Li_2B_4O_7$ and $Li(B(C_2O_4)F_2)$, imide salts, such as $LiN(SO_2CF_3)_2$, $LiN(C_lF_{2l+1}SO_2)(C_mF_{2m+1}SO_2)$ {1 and m are integers of 1 or more}. These lithium salts may be used alone or as a mixture of two or more. Of these lithium salts, $LiPF_6$ is preferably used from the viewpoints of ionic conductivity, electrochemical stability, and the like. The concentration of the lithium salt is preferably 0.8 to 1.8 mol per liter of the non-aqueous solvent.

<Separator>

The separator is formed of an insulating porous sheet having ion permeability. Specific examples, of the porous sheet include a microporous thin film, a woven fabric, and a non-woven fabric. Examples of suitable materials of the separator include olefin-based resins, such as polyethylene and polypropylene, and cellulose. The separator may be a layered product having a cellulose fiber layer and a thermoplastic resin fiber layer made of an olefin-based resin or the like.

EXAMPLES

The present invention will be described below in more detail by way of Examples, but the present invention is not limited to these Examples.

Example 1

[Production of Positive Electrode Active Material]

A transition metal oxide was formed by roasting $[Ni_{0.51}Co_{0.23}Mn_{0.26}](OH)_2$ obtained by coprecipitation. The transition metal oxide, $Li_2CO_3$, and $LiBO_2$ were mixed using an Ishikawa grinding mixer such that the molar ratio of Li, all transition metals, and boron was 1.06:1:0.001. The mixture was then fired at 950° C. in an air atmosphere for 10 hours and pulverized to provide a lithium-nickel-manganese-cobalt composite oxide containing boron and having an average secondary particle size of about 14 μm. The difference in composition ratio between nickel and manganese was 0.25.

A coating solution was prepared by diluting 2.2 g of lithium metaborate with distilled water to a volume of 75 ml. While 500 g of the lithium-nickel-manganese-cobalt composite oxide containing boron was stirred on a fluorine resin-coated bat by using a polypropylene spatula, the coating solution was sprayed with a spray and dried at 120° C. for 2 hours. The obtained powder was heated at 300° C. in an air atmosphere for 5 hours to prepare positive electrode active material particles.

[Proportion of Boron Element Present in Inner Part of Secondary Particles]

The obtained positive electrode active material particles were washed for 20 minutes, and the amount of boron in water was determined by ICP analysis. The obtained positive electrode active material was dissolved in hydrochloric acid, and the amount of boron in the solution was determined by ICP analysis. These values are respectively defined as the amount of boron present in the surface of secondary particles of the positive electrode active material (hereinafter referred to as a surface boron content) and the amount of boron present in the surface and inner part of the secondary particles of the positive electrode active material (hereinafter referred to as a total boron content). As a result of application of these values to the following formula, the proportion of the boron element content in the inner part of the secondary particles to the total boron element content in the surface and inner part of the secondary particles (hereinafter may be referred to as an inner boron proportion) was found to be 9.4% by mass.

Inner Boron Proportion (% by mass)=(1−(Surface Boron Content/Total Boron Content))×100

[Production of Batter]

The positive electrode active material particles, carbon black serving as a conductive material, and an N-methyl-2-pyrrolidone solution in which polyvinylidene fluoride was dissolved as a binding material were weighed such that the mass ratio of the positive electrode active material particles, the conductive material, and the binding material was 95:2.5:2.5. The resulting mixture was kneaded to prepare a positive electrode mixture slurry.

The positive electrode mixture slurry was then applied to each surface of the positive electrode current collector made of an aluminum foil and dried, followed by rolling with a rolling roller. A current collecting tab made of aluminum was attached to the rolled product to produce a positive electrode in which the positive electrode mixture layer was formed on each surface of the positive electrode current collector.

A three-electrode split test cell was produced by using the positive electrode as a working electrode and metal lithium as a counter electrode and a reference electrode. As a non-aqueous electrolyte, a non aqueous electrolyte solution in which 1 mol/L of $LiPF_6$ was dissolved in a solvent mixture containing ethylene carbonate and methyl ethyl carbonate at a volume ratio of 3:7 was used. The three-electrode split test cell thus produced is hereinafter referred to as a battery A1.

Example 2

A positive electrode active material and a battery A2 were produced in the same conditions as those in Example 1 except that $Li_2CO_3$, $LiBO_2$, and the transition metal oxide formed by roasting $[Ni_{0.51}Co_{0.23}Mn_{0.26}](OH)_2$ were mixed using an Ishikawa grinding mixer such that the molar ratio of Li, all transition metals, and boron was 1.06:1:0.002. The inner boron proportion in the positive electrode active material of Example 2 was found to be 13.6% by mass.

Example 3

A positive electrode active material and a battery A3 were produced in the same conditions as those in Example 1 except that $Li_2CO_3$, $LiBO_2$, and the transition metal oxide formed by roasting $[Ni_{0.51}Co_{0.23}Mn_{0.26}](OH)_2$ were mixed using an Ishikawa grinding mixer such that the molar ratio of Li, all transition metals, and boron was 1.06:1:0.03. The inner boron proportion in the positive electrode active material of Example 3 was found to be 26.8% by mass.

Example 4

A positive electrode active material and a battery A4 were produced in the same conditions as those in Example 1 except that $Li_2CO_3$, $LiBO_2$, and the transition metal oxide formed by roasting $[Ni_{0.51}Co_{0.23}Mn_{0.26}](OH)_2$ were mixed using an Ishikawa grinding mixer such that the molar ratio of Li, all transition metals, and boron was 1.06:1:0.003 and except that the amount of lithium metaborate added to the coating solution was 4.4 g. The inner boron proportion in the positive electrode active material of Example 4 was found to be 53.2% by mass.

Comparative Example 1

A positive electrode active material and a battery B1 were produced in the same conditions as those in Example 1 except that $Li_2CO_3$ and the transition metal oxide formed by roasting $[Ni_{0.51}Co_{0.23}Mn_{0.26}](OH)_2$ were mixed without adding $LiBO_2$. The inner boron proportion in the positive electrode active material of Comparative Example 1 was found to be 1.9% by mass.

Comparative Example 2

A battery B2 was produced in the same conditions as those in Example 1 except that the lithium-nickel-manganese-cobalt composite oxide containing boron obtained in Example 1 was used as a positive electrode active material (a positive electrode active material to which the coating solution containing lithium metaborate was not sprayed). The inner boron proportion in the positive electrode active material of Comparative Example 2 was found to be 93.8% by mass.

<Initial Charging and Discharging>

The charge/discharge test described below was carried out using the produced batteries A1 to A4 and B1 to B2.
Charging Conditions in First Cycle
Under a temperature condition of 25° C., each battery was subjected to constant-current charging to 4.3 V (vs. Li/Li+) at a current density of 20 mA and subjected to constant-voltage charging at a constant voltage of 4.3 V (vs. Li/Li+) until the current density reached 5 mA.
Discharging Conditions in First Cycle
Under a temperature condition of 25° C. each battery was subjected to constant-current discharging to 2.5 V (vs. Li/Li+) at a current density of 20 mA.
Resting Conditions
Each battery was allowed to rest for 10 minutes between charging and discharging.
<Measurement of Initial DCR>
The initial DCR of each battery was measured in the following conditions after the charge/discharge test.
OCV Control
Under a temperature condition of 25° C., each battery was subjected to constant-current charging to 3.8 V (vs. Li/Li+) at a current density of 20 mA and subjected to constant-voltage charging at a constant voltage of 3.8 V (vs. Li/Li+) until the current density reached 5 mA.
DCR Measurement
After the OCV control, under a temperature condition of 25° C., each battery was discharged at a current density of 20 mA, and the voltage before discharging and the voltage after 0.1 seconds of discharging were measured. The measured voltages were applied to the following formula to calculate the initial DCR of each battery.

DCR (Ω)=(Voltage before Discharging−Voltage after 0.1 Seconds of Discharging)/Current <Measurement of DCR after Storage Test>
The charge/discharge test described below was carried out using the produced batteries A1 to A4 and B1 to B2.
Initial Charging and Discharging Conditions
Each battery was charged and discharged in the same conditions as those described above.
Storage Test
Under a temperature condition of 25° C., each battery was subjected to constant-current charging to 4.3 V (vs. Li/Li+) at a current density of 20 mA and subjected to constant-voltage charging at a constant voltage of 4.3 V (vs. Li/Li+) until the current density reached 5 mA. The battery in a charged state was continuously charged at a constant voltage of 4.3 V (vs. Li/Li+) in a 50° C. thermostatic bath for 24 hours. Under a temperature condition of 25° C., each battery was subjected to constant-current discharging to 2.5 V (vs. Li/Li+) at a current density of 20 mA.
Measurement of DCR
After the storage test, the voltage was measured in the same conditions as those described above. The measured voltages were applied to the above formula to calculate the DCR of each battery after the storage test.
<Calculation of Increase in Resistance>
The obtained DCRs were applied to the following formula to give an increase in resistance.

Increase in Resistance (Ω)=Initial DCR−DCR after Storage Test

The increases in the resistance of the batteries A1 to A4 (Examples 1 to 4) and the batteries. B1 to B2 (Comparative Examples 1 to 2) are shown in Table 1.

TABLE 1

| | Positive Electrode Active Material | | |
|---|---|---|---|
| Battery | Ni-Mn | Inner Boron Proportion (% by mass) | Increase in Resistance (Ω) |
| A1 | 0.25 | 9.4 | 0.013 |
| A2 | 0.25 | 13.6 | 0.012 |
| A3 | 0.25 | 26.8 | 0.013 |
| A4 | 0.25 | 53.2 | 0.018 |
| B1 | 0.25 | 1.9 | 0.100 |
| B2 | 0.25 | 93.8 | 0.125 |

The batteries A1 to A4 each including the positive electrode active material in which the difference in composition ratio between Ni and Mn is 0.25 and the inner boron proportion of the secondary particles is in the range from 5% by mass to 60% by mass exhibit smaller increases in resistance than the battery B1 including the positive electrode active material in which the inner boron proportion of the secondary particles is less than 5% by mass and the battery B2 including the positive electrode active material in which the inner boron proportion of the secondary particles is more than 60% by mass. This result indicates that an increase in the DC R of the batteries A1 to A4 during high-temperature storage can be suppressed.

Example 5

A positive electrode active material and a battery A5 were produced in the same conditions as those in Example 1 except that the transition metal oxide formed by roasting $[Ni_{0.51}Co_{0.23}Mn_{0.26}]OH)_2$ was replaced by the transition metal oxide formed by roasting $[Ni_{0.55}Co_{0.20}Mn_{0.25}](OH)_2$. For the positive electrode active material of Example 5, the difference in composition ratio between nickel and manganese was 0.30, and the inner boron proportion was found to be 13.0% by mass.

Example 6

A positive electrode active material and a battery A6 were produced in the same conditions as those in Example 2 except that the transition metal oxide formed by roasting $[Ni_{0.51}Co_{0.23}Mn_{0.26}](OH)_2$ was replaced by the transition metal oxide formed by roasting $[Ni_{0.55}Co_{0.20}Mn_{0.25}](OH)_2$. For the positive electrode active material of Example 6, the difference in composition ratio between nickel and manganese was 0.30, and the inner boron proportion was found to be 22.9% by mass.

Example 7

A positive electrode active material and a battery A7 were produced in the same conditions as those in Example 3 except that the transition metal oxide formed by roasting $[Ni_{0.51}Co_{0.23}Mn_{0.26}](OH)_2$ was replaced by the transition metal oxide formed by roasting $[Ni_{0.55}Co_{0.20}Mn_{0.25}](OH)_2$. For the positive electrode active material of Example 7, the difference in composition ratio between nickel and manganese was 0.30, and the inner boron proportion was found to be 36.7% by mass.

Example 8

A positive electrode active material and a battery A8 were produced in the same conditions as those in Example 4 except that the transition metal oxide formed by roasting $[Ni_{0.51}Co_{0.23}Mn_{0.26}](OH)_2$ was replaced by the transition metal oxide formed by roasting $[Ni_{0.55}Co_{0.20}Mn_{0.25}](OH)_2$. For the positive electrode active material of Example 8, the difference in composition ratio between nickel and manganese was 0.30, and the inner boron proportion was found to be 51.1% by mass.

Comparative Example 3

A positive electrode active material and a battery B3 were produced in the same conditions as those in Comparative Example 1 except that the transition metal oxide formed by roasting $[Ni_{0.51}Co_{0.23}Mn_{0.26}](OH)_2$ was replaced by the transition metal oxide formed by roasting $[Ni_{0.55}Co_{0.20}Mn_{0.25}](OH)_2$. For the positive electrode active material of Comparative Example 3, the difference in composition ratio between nickel and manganese was 0.30, and the inner boron proportion was found to be 2.3% by mass.

Comparative Example 4

A positive electrode active material and a battery B4 were produced in the same conditions as those in Comparative Example 2 except that the transition metal oxide formed by roasting $[Ni_{0.51}Co_{0.23}Mn_{0.26}](OH)_2$ was replaced by the transition metal oxide formed by roasting $[Ni_{0.55}Co_{0.20}Mn_{0.25}](OH)_2$. For the positive electrode active material of Comparative Example 4, the difference in composition ratio between nickel and manganese was 0.30, and the inner boron proportion obtained from the above formula was 95.2% by mass.

The increases in the resistance of the batteries A5 to A8 (Examples 5 to 8) and the batteries B3 to B4 (Comparative Examples 3 to 4) produced above were obtained in the same test conditions as those described above. The results are summarized in Table 2.

TABLE 2

| | Positive Electrode Active Material | | Increase |
|---|---|---|---|
| Battery | Ni-Mn | Inner Boron Proportion (% by mass) | in Resistance (Ω) |
| A5 | 0.30 | 13.0 | 0.013 |
| A6 | 0.30 | 22.9 | 0.004 |
| A7 | 0.30 | 36.7 | 0.015 |
| A8 | 0.30 | 51.1 | 0.022 |
| B3 | 0.30 | 2.3 | 0.121 |
| B4 | 0.30 | 95.2 | 0.278 |

The batteries A5 to A8 each including the positive electrode active material in which the difference in composition ratio between Ni and Mn is 0.30 and the inner boron proportion of the secondary particles is in the range from 5% by mass to 60% by mass exhibit smaller increases in resistance than the battery B3 including the positive electrode active material in which the inner boron proportion of the secondary particles is less than 5% by mass and the battery B4 including the positive electrode active material in which the inner boron proportion of the secondary particles is more than 60% by mass. This result indicates that increases in the DCR of the batteries A5 to A8 during high-temperature storage can be suppressed.

Comparative Example 5

A positive electrode active material and a battery 85 were produced in the same conditions as those in Example 1 except that the transition metal oxide formed by roasting $[Ni_{0.51}C_{0.23}Mn_{0.26}](OH)_2$ was replaced by the transition metal oxide formed by roasting $[Ni_{0.50}Co_{0.20}Mn_{0.30}](OH)_2$. For the positive electrode active material of Comparative Example 5, the difference in composition ratio between nickel and manganese was 0.20, and the inner boron proportion obtained from the above formula was 9.5% by mass.

Comparative Example 6

A positive electrode active material and a battery B6 were produced in the same conditions as those in Example 2 except that the transition metal oxide formed by roasting $[Ni_{0.51}Co_{0.23}Mn_{0.26}](OH)_2$ was replaced by the transition metal oxide formed by roasting $[Ni_{0.50}Co_{0.20}Mn_{0.30}](OH)_2$. For the positive electrode active material of Comparative Example 6, the difference in composition ratio between nickel and manganese was 0.20, and the inner boron proportion obtained from the above formula was 13.5% by mass.

Comparative Example 7

A positive electrode active material and a battery B7 were produced in the same conditions as those in Example 3 except that the transition metal oxide formed by roasting $[Ni_{0.51}Co_{0.23}Mn_{0.26}](OH)_2$ was replaced by the transition metal oxide formed by roasting $[Ni_{0.50}Co_{0.20}Mn_{0.30}](OH)_2$. For the positive electrode active material of Comparative Example 7, the difference in composition ratio between nickel and manganese was 0.20, and the inner boron proportion obtained from the above formula was 33.9% by mass.

Comparative Example 8

A positive electrode active material and a battery B8 were produced in the same conditions as those in Example 4 except that the transition metal oxide formed by roasting [Ni$_{0.51}$Co$_{0.23}$Mn$_{0.26}$](OH)$_2$ was replaced by the transition metal oxide formed by roasting [Ni$_{0.50}$Co$_{0.20}$Mn$_{0.30}$](OH)$_2$. For the positive electrode active material of Comparative Example 8, the difference in composition ratio between nickel and manganese was 0.20, and the inner boron proportion obtained from the above formula was 58.9% by mass.

Comparative Example 9

A positive electrode active material and a battery B9 were produced in the same conditions as those in Comparative Example 1 except that the transition metal oxide formed by roasting [Ni$_{0.51}$Co$_{0.23}$Mn$_{0.26}$](OH)$_2$ was replaced by the transition metal oxide formed by roasting [Ni$_{0.50}$Co$_{0.20}$Mn$_{0.30}$](OH)$_2$. For the positive electrode active material of Comparative Example 9, the difference in composition ratio between nickel and manganese was 0.20, and the inner boron proportion obtained from the above formula was 2.6% by mass.

Comparative Example 10

A positive electrode active material and a battery B10 were produced in the same conditions as those in Comparative Example 2 except that the transition metal oxide formed by roasting [Ni$_{0.51}$Co$_{0.23}$Mn$_{0.26}$](OH)$_2$ was replaced by the transition metal oxide formed by roasting [Ni$_{0.50}$Co$_{0.20}$Mn$_{0.30}$](OH)$_2$. For the positive electrode active material of Comparative Example 10, the difference in composition ratio between nickel and manganese was 0.20, and the inner boron proportion obtained from the above formula was 96.8% by mass.

The increases in the resistance of the batteries B5 to B10 (Comparative Examples 5 to 10) produced above were obtained in the same test conditions as those described above. The results are summarized in Table 3.

TABLE 3

| Battery | Positive Electrode Active Material | | Increase in Resistance (Ω) |
|---|---|---|---|
| | Ni-Mn | Inner Boron Proportion (% by mass) | |
| B5 | 0.20 | 9.5 | 0.113 |
| B6 | 0.20 | 13.5 | 0.102 |
| B7 | 0.20 | 33.9 | 0.078 |
| B8 | 0.20 | 58.9 | 0.142 |
| B9 | 0.20 | 2.6 | 0.139 |
| B10 | 0.20 | 96.8 | 0.159 |

When the difference in composition ratio between Ni and Mn in the positive electrode active material is 0.20 or less, the increase in resistance is high at different inner boron proportions of the secondary particles.

These results indicate that, when the difference in composition ratio between Ni and Mn in a positive electrode active material is more than 0.2 and the inner boron proportion of the secondary particles is in the range from 5% by mass to 60% by mass, the elution of Ni can be suppressed, the side reaction in the surface of the secondary particles can be suppressed, and an increase in DCR during high-temperature storage can be suppressed. Even when the inner boron proportion of the secondary particles is in the range from 5% by mass 60% by mass, a difference in composition ratio between Ni and Mn of 0.20 or less in the positive electrode active material results in insufficient suppression of an increase in DCR during high-temperature storage.

Since a positive electrode active material in which the difference in composition ratio between Ni and Mn is 0.2 or less has low affinity to boron, boron is unlikely to be uniformly present in the inner part of the secondary particles and furthermore, the boron compound is not uniformly attached to the surface of the secondary particles, so that a fine coating film is unlikely to form. Because of this, neither the elution of Ni nor the side reaction in the surface of the secondary particles is suppressed even when the inner boron proportion of the secondary particles is in the range from 5% by mass to 60% by mass in the positive electrode active material in which the difference in composition ratio between Ni and Mn is 0.2 or less.

INDUSTRIAL APPLICABILITY

The present invention can be applied to positive electrode active materials for non-aqueous electrolyte secondary batteries.

REFERENCE SIGNS LIST

10 Positive Electrode Active Material Particles
20 Primary Particle
21 Secondary Particle
22a Boron Compound in Surface of Secondary Particle
22b Boron Compound in Inner Part of Secondary Particle

The invention claimed is:

1. A positive electrode active material for non-aqueous electrolyte secondary batteries, comprising: secondary particles formed by aggregation of primary particles of a lithium transition metal oxide containing Ni and Mn; and a boron compound present in an inner part and surface of the secondary particles,
wherein
a difference in composition ratio between Ni and Mn in the lithium transition metal oxide is more than 0.2, and
a proportion of a boron element content in the inner part of the secondary particles to a total boron element content in the inner part and surface of the secondary particles is in a range from 5% by mass to 60% by mass.

2. The positive electrode active material for non-aqueous electrolyte secondary batteries according to claim 1, wherein the boron compound present in the surface of the secondary particles is at least one compound selected from lithium borate, lithium metaborate, and lithium tetraborate.

3. The positive electrode active material for non-aqueous electrolyte secondary batteries according to claim 1,
wherein
the lithium transition metal oxide contain; boron, and
at least part of the boron compound present in the inner part of the secondary particles is the lithium transition metal oxide containing boron.

4. The positive electrode active material for non-aqueous electrolyte secondary batteries according to claim 1, wherein the difference in composition ratio between Ni and Mn in the lithium transition metal oxide is 0.25 or more.

5. The positive electrode active material for non-aqueous electrolyte secondary batteries according to claim 1, wherein the proportion of the boron element content in the inner part of the secondary particles to the total boron element content in the inner part and surface of the secondary particles is in a range from 9% by mass to 53% by mass.

\* \* \* \* \*